6321X
A. Gorham,
Stump Elevator.
Patented Jan. 7, 1831.
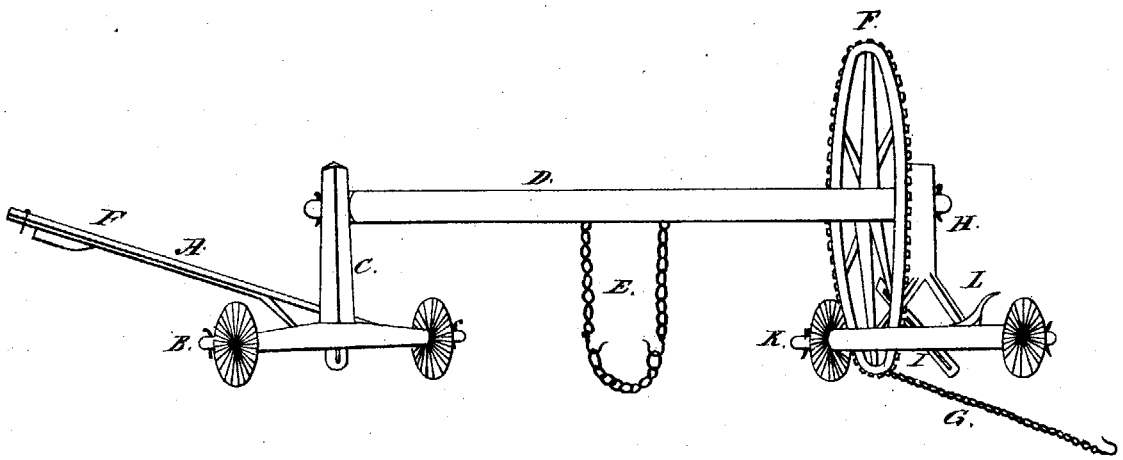
AM. PHOTO-LITHO. CO. N.Y. (OSBORNE'S PROCESS)

The schedule referred to, in these Letters Patent and making part of the same containing description in the [illegible] words of the said Abijah Gorham himself, of his improvement in the machine called "Gorham's stump machine"

This improvement in taking out stumps by this machine is calculated to be of great utility; it performs the work in an expeditious manner, and so that three yoke of Oxen and three men, can easily raise and clear out forty stumps in one day, of its operation, from land of ordinary quality; and by a recurrence to the annexed draft of the machine, it may be observed that one yoke of Oxen, appended to the pole, marked A, is sufficient to move the machine to any part of the field required, and two yoke of Oxen attached to the chain or rope, marked. C, is sufficient to raise stumps of middling size, and from three to four yoke of Oxen can raise stumps of the largest size; and for other particulars with regard to said machine, reference is made to the annexed drawing.

In testimony that the above is a true specification of my said invention and improvement as above described I have hereto set my hand and seal this third day of June in the year of our Lord One thousand eight hundred and thirty Abijah Gorham (3)

Witnesses
William. H. Porter
Billings Hood (250 words)

Exd. [illegible]